US012780558B2

(12) United States Patent
Carroll et al.

(10) Patent No.: US 12,780,558 B2
(45) Date of Patent: Nov. 3, 2026

(54) SYSTEMS AND METHODS FOR IDENTIFYING AND ALERTING OF FOOTPRINT OVER-CYCLE RISKS ON MULTI-PRODUCT GENERAL ASSEMBLY LINES

(71) Applicants: GM GLOBAL TECHNOLOGY OPERATIONS LLC, Detroit, MI (US); TEXAS TECH UNIVERSITY, Lubbock, TX (US)

(72) Inventors: Dennis J. Carroll, Leander, TX (US); Charles Alvin Wiley, Austin, TX (US); Sai Rohit Kumar Danda, Dublin (IE); Vikram Jeet, Greystones (IE); Paerhati Remutula, Limerick (IE); Kegan Austin Clark, Lake St. Louis, MO (US); Micheal Morrow, St. Peters, MO (US); David Gutman, Lubbock, TX (US); Allan Gurwicz, Lubbock, TX (US); George Fernandes, Lubbock, TX (US)

(73) Assignees: GM GLOBAL TECHNOLOGY OPERATIONS LLC, Detroit, MI (US); TEXAS TECH UNIVERSITY, Lubbock, TX (US)

( * ) Notice: Subject to any disclaimer, the term of this patent is extended or adjusted under 35 U.S.C. 154(b) by 715 days.

(21) Appl. No.: 18/120,756

(22) Filed: Mar. 13, 2023

(65) Prior Publication Data

US 2024/0308781 A1 Sep. 19, 2024

(51) Int. Cl.
*B65G 43/08* (2006.01)

(52) U.S. Cl.
CPC ...... *B65G 43/08* (2013.01); *B65G 2201/0294* (2013.01); *B65G 2203/0208* (2013.01)

(58) Field of Classification Search
CPC ............ B65G 43/08; B65G 2201/0294; B65G 2203/0208; G06Q 10/0635; G06Q 50/04;
(Continued)

(56) References Cited

U.S. PATENT DOCUMENTS

| | | | | |
|---|---|---|---|---|
| 6,249,715 B1 * | 6/2001 | Yuri | G06Q 10/04 | 702/182 |
| 7,039,484 B2 * | 5/2006 | Daferner | G06Q 10/04 | 700/28 |

(Continued)

OTHER PUBLICATIONS

U.S. Appl. No. 18/120,779, filed Mar. 13, 2023, Carroll et al.

*Primary Examiner* — Joseph C Rodriguez

(57) ABSTRACT

A system includes a module configured to, for each footprint of a conveyor, identify vehicle groups having different vehicle characteristics and over-cycle distributions for each vehicle group or a back-to-back sequence of any given vehicle group by calculating, for each vehicle characteristic, over-cycle distributions for a first vehicle group having the vehicle characteristic and a second vehicle group not having the vehicle characteristic, determining whether either the number of vehicles in the first or second vehicle group or a difference between the over-cycle distributions for the first and second vehicle groups satisfies a threshold condition, and in response, cease identifying the vehicle groups. The module is configured to identify, for a received actual vehicle sequence, over-cycle risks based on the identified vehicle groups and the over-cycle distributions for each vehicle group or a back-to-back sequence of any given vehicle group. Other examples systems and methods are also disclosed.

20 Claims, 6 Drawing Sheets

(58) Field of Classification Search
CPC .......... G05B 19/4183; G05B 19/41865; G05B 19/41875; G05B 19/41885
USPC .......................................... 700/100, 108, 111
See application file for complete search history.

(56) References Cited

U.S. PATENT DOCUMENTS

| | | | | |
|---|---|---|---|---|
| 7,379,782 | B1 * | 5/2008 | Cocco | G06Q 10/06 703/2 |
| 11,693,956 | B2 * | 7/2023 | Putman | G06F 21/566 726/23 |
| 2006/0136085 | A1 * | 6/2006 | Steinhilper | G05B 19/41865 29/430 |
| 2006/0259174 | A1 * | 11/2006 | Daferner | G05B 19/41865 700/100 |
| 2010/0114353 | A1 * | 5/2010 | Domrose | G06Q 10/06 700/100 |
| 2013/0060371 | A1 * | 3/2013 | Kienzle | G06Q 10/06316 700/100 |
| 2016/0139592 | A1 * | 5/2016 | Aqlan | G05B 19/41865 700/100 |
| 2023/0324891 | A1 * | 10/2023 | Crawford | G05B 19/41865 700/100 |

* cited by examiner

SYSTEMS AND METHODS FOR IDENTIFYING AND ALERTING OF FOOTPRINT OVER-CYCLE RISKS ON MULTI-PRODUCT GENERAL ASSEMBLY LINES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for identifying and alerting of footprint over-cycle risks on multi-product general assembly lines.

An assembly line may include multiple conveyors that advance vehicles or vehicle subassemblies through footprints in unison and at a constant speed. Each footprint of the assembly lines represents a location where, over a period of time, one or more tasks are completed in assembling vehicle content (e.g., a cycle) before the vehicle advances. This equates to a cycle time per footprint. If the tasks of assembling the vehicle content at one of the footprints of a conveyor is not finished within its cycle time, an over-cycle event occurs. In connection therewith, an alarm may be manually and/or automatically activated to notify supervisors, other workers, etc. of the over-cycle event or a possibility of an over-cycle event. If the alarm is not cleared, the conveyor (and possibly other upstream and/or downstream conveyors) stop.

SUMMARY

A method is disclosed for identifying over-cycle risks associated with an assembly line including at least one conveyor configured to move vehicles through a plurality of footprints in unison. Each footprint represents a location where vehicle content is assembled. The method includes receiving historical data; for each footprint of the conveyor, and identifying vehicle groups having different vehicle characteristics and over-cycle distributions for each vehicle group or a back-to-back sequence of any given vehicle group by calculating, based on the received historical data, for each vehicle characteristic of the different vehicle characteristics, an over-cycle distribution for a first vehicle group having the vehicle characteristic and an over-cycle distribution for a second vehicle group not having the vehicle characteristic, determining whether either the number of vehicles in the first or second vehicle group or a difference between the over-cycle distributions for the first and second vehicle groups satisfies a threshold condition, and in response to satisfying the threshold condition, cease identifying the vehicle groups. The method further includes receiving an actual vehicle sequence for the assembly line, and identifying, for the actual vehicle sequence for the assembly line, over-cycle risks based on the identified vehicle groups and the over-cycle distributions for each vehicle group or a back-to-back sequence of any given vehicle group.

In other features, the method includes, in response to not satisfying the threshold condition, selecting the vehicle characteristic having the largest over-cycle distribution difference, and calculating, for a vehicle group having the selected vehicle characteristic, an over-cycle distribution for a first subset of the vehicle group having another vehicle characteristic of the different vehicle characteristics and an over-cycle distribution for a second subset of the vehicle group not having the other vehicle characteristic.

In other features, calculating the over-cycle distributions for the first and second subsets of the vehicle group includes calculating the over-cycle distributions with the Kaplan-Meier method.

In other features, the method includes determining whether either the number of vehicles in the first or second subset of the vehicle group or a difference between the over-cycle distributions for the first and second subsets of the vehicle group satisfies the threshold condition, and cease identifying the vehicle groups includes cease identifying the vehicle groups in response to either the number of vehicles in the first or second subset of the vehicle group or the difference between the over-cycle distributions for the first and second subsets of the vehicle group satisfying the threshold condition.

In other features, calculating, for each vehicle characteristic, the over-cycle distribution for the first vehicle group and the over-cycle distribution for the second vehicle group includes calculating the over-cycle distribution for the first vehicle group and the over-cycle distribution for the second vehicle group with the Kaplan-Meier method.

In other features, the method includes generating and transmitting an alert signal indicating the over-cycle risks.

In other features, the over-cycle risks include probabilities of different over-cycle times at a footprint of the assembly line.

In other features, transmitting the alert signal includes transmitting the alert signal to a supervisor control module.

A system for identifying over-cycle risks associated with an assembly line is disclosed. The assembly line includes at least one conveyor configured to move vehicles through a plurality of footprints in unison. Each footprint represents a location where vehicle content is assembled. The system includes a computing module configured to receive historical data, and for each footprint of the conveyor, identify vehicle groups having different vehicle characteristics and over-cycle distributions for each vehicle group or a back-to-back sequence of any given vehicle group by calculating, based on the received historical data, for each vehicle characteristic of the different vehicle characteristics, an over-cycle distribution for a first vehicle group having the vehicle characteristic and an over-cycle distribution for a second vehicle group not having the vehicle characteristic, determining whether either the number of vehicles in the first or second vehicle group or a difference between the over-cycle distributions for the first and second vehicle groups satisfies a threshold condition, and in response to satisfying the threshold condition, cease identifying the vehicle groups. The computing module is further configured to receive an actual vehicle sequence for the assembly line, and identify, for the actual vehicle sequence for the assembly line, over-cycle risks based on the identified vehicle groups and the over-cycle distributions for each vehicle group or a back-to-back sequence of any given vehicle group.

In other features, the computing module is configured, in response to not satisfying the threshold condition, to select the vehicle characteristic having the largest over-cycle distribution difference, and calculate, for a vehicle group having the selected vehicle characteristic, an over-cycle distribution for a first subset of the vehicle group having another vehicle characteristic of the different vehicle characteristics and an over-cycle distribution for a second subset of the vehicle group not having the other vehicle characteristic.

In other features, the computing module is configured to calculate the over-cycle distributions for the first and second subsets of the vehicle group with the Kaplan-Meier method.

In other features, the computing module is configured to determine whether either the number of vehicles in the first or second subset of the vehicle group or a difference between the over-cycle distributions for the first and second subsets of the vehicle group satisfies the threshold condition, and in response to either the number of vehicles in the first or second subset of the vehicle group or the difference between the over-cycle distributions for the first and second subsets of the vehicle group satisfying the threshold condition, cease identifying the vehicle groups.

In other features, the computing module is configured to calculate the over-cycle distributions for the first and second vehicle groups with the Kaplan-Meier method.

In other features, the computing module is configured to generate and transmit an alert signal indicating the over-cycle risks.

In other features, the over-cycle risks include probabilities of different over-cycle times at a footprint of the assembly line.

In other features, the computing module is configured to transmit the alert signal to a supervisor control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An assembly line includes multiple conveyors that advance vehicles through footprints. As the vehicles advance along the assembly line, each footprint has its own task list of one or more tasks to be performed on each vehicle based on the vehicle's characteristics (e.g., options, body style, etc.). The task list for each footprint may vary (sometimes significantly) from vehicle to vehicle based on each particular vehicle and its characteristics. The amount of work required in each footprint varies based on the vehicle's characteristics. As such, the time per footprint required to complete tasks varies. For example, the same task at a footprint for a truck may take 10 seconds, but 15 seconds for a van. Additionally, the time per footprint required to complete tasks may vary due to a sequence of consecutive vehicles. For instance, a task at a footprint for a vehicle may be completed in an allotted time, and the same or a different task at the same footprint for another vehicle may be completed in an allotted time if the vehicles are not back-to-back. However, if the vehicles are back-to-back, the task at the footprint for the second vehicle (of the back-to-back vehicles) may take more than its allotted time. If the tasks of assembling the vehicle content at one of the footprints of a conveyor is not finished within the cycle time, the conveyor (and possibly other upstream and/or downstream conveyors) may stop. As such, engineers seek to order vehicles entering the assembly line in an attempt to avoid back-to-back worst-case work demands (e.g., having two or more vans in a sequence according to the example above). However, this may be impossible due to errors, random chance, different vehicle blends, etc.

The systems and methods according to the present disclosure provide mechanisms for extracting performance profiles for defined groups of vehicles at given footprints and then leveraging the performance profiles to forecast over-cycle risks in real-time at each footprint on an assembly line for any given vehicle sequence. As such, supervisors may be alerted in advance of the over-cycle risks as vehicles move through the assembly line, and take measures (e.g., change staffing at a particular footprint, etc.) to avert the risks and conveyor stoppages. As a result, over cycle stops are reduced and production throughput of the assembly line is increased.

Figure 1:
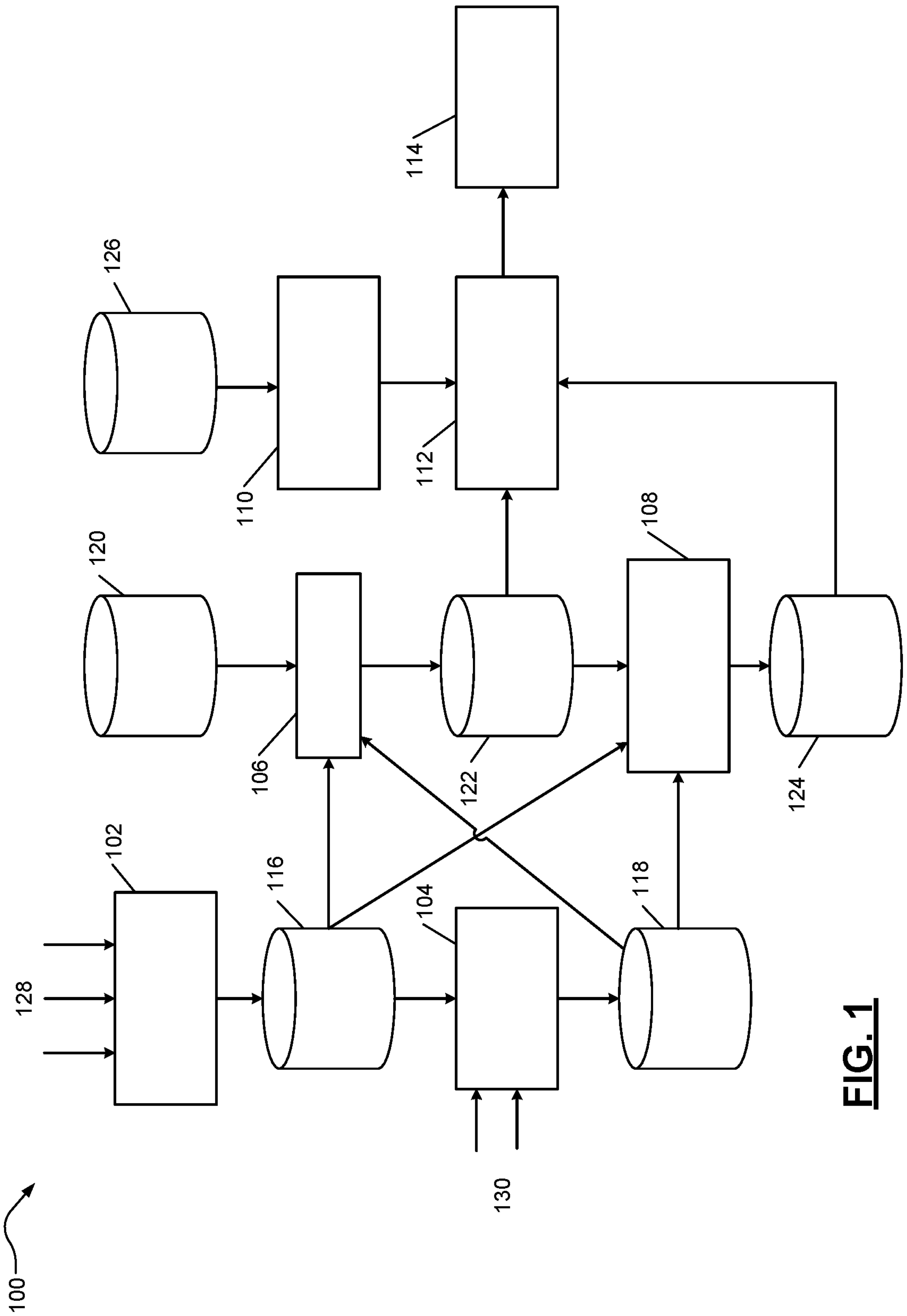
FIG. 1 is a functional block diagram of an example system according to the present disclosure.

Referring now to FIG. 1, a functional block diagram of an example system 100 is presented. As shown, the system 100 generally includes various databases and modules for extracting performance profiles for defined groups of vehicles at given footprints in an assembly line, identifying over-cycle risks, generating alerts, etc. For example, the modules of the system 100 may include a vehicle cycle build module 102, a stop history build module 104, a grouping module 106, a performance profile module 108, a vehicle sequence controller 110, an alert generation module 112, and a supervisor control module 114. The databases of the system 100 may include a cycle definition database 116, an over-cycle database 118, a vehicle configurations database 120, a vehicle group definitions database 122, a performance profiles database 124, and a vehicle history entries database 126. While FIG. 1 is shown as including a specific number of modules and databases, it should be apparent to those skilled in the art that the system 100 of FIG. 1 may include more or less modules and/or databases. For instance, two or more of the databases (or modules) shown in FIG. 1 may be combined.

In the example of FIG. 1, the vehicle cycle build module 102 categorizes definitions for multiple conveyors representing conveyor contents per cycle, and then stores the conveyor contents per cycle definitions to the cycle definition database 116. For example, the vehicle cycle build module 102 may determine the conveyor cycle definitions based on data from one or more inputs (collectively shown as 128). In such examples, the vehicle cycle build module 102 may receive conveyor data (e.g., a name/ID of each conveyor of the assembly line, the number of footprints in each conveyor of the assembly line, etc.), vehicle history data (e.g., past vehicle sequences of entering the assembly line, time stamps of the vehicle sequences, etc.), etc. Based on the collected data, the vehicle cycle build module 102 builds the conveyor cycle definitions for multiple conveyors by categorizing vehicles into footprints per cycle on each conveyor of the assembly line. For example, the conveyor cycle definitions may include categorized data specific to particular conveyors, cycle numbers, cycles start/stop times, footprints in each conveyor, etc.

The stop history build module 104 categorizes information specific to over-cycle events and then stores the information in the over-cycle database 118. The stop history build module 104 may do so based on data from one or more inputs (collectively shown as 130), data from the cycle definition database 116, etc. For example, the stop history build module 104 may receive target cycle times for each conveyor, actual over-cycle data (e.g., durations of over-cycles, locations of over-cycles, etc.), the conveyor cycle definitions, etc. Based on the collected data, the stop history build module 104 may categorize a conveyor cycle with over-cycle events per footprint for each conveyor of the assembly line. The information stored in the cycle definition database 116 and the over-cycle database 118 may form, at least in part, historical data representing vehicle-footprint performance.

The grouping module 106 identifies vehicles groups having different vehicle characteristics based on the vehicle-footprint performance, as further explained below. For example, and as shown in FIG. 1, the grouping module 106 receives data from the cycle definition database 116 and the over-cycle database 118, and data representing possible vehicle characteristics from the vehicle configurations database 120. In such examples, the vehicle characteristics may include body styles (e.g., truck frames, van frames, etc.), regular production options (RPOs), etc. The RPOs may include, for example, any option in addition to or reduction of a base vehicle setup, such as color, leather seats, four-wheel drive, no front seats, etc. The identified vehicles groups are then stored in the vehicle group definitions database 122.

The performance profile module 108 determines performance profiles (e.g., over-cycle distributions) of the vehicle groups identified by the grouping module 106, as further explained below. To determine performance profiles, the performance profile module 108 receives data from the cycle definition database 116 and the over-cycle database 118, and data (e.g., the identified vehicles groups) from the vehicle group definitions database 122. The performance profiles are then stored in the performance profiles database 124.

The vehicle sequence controller 110 controls the actual sequence of vehicles passing through the assembly line. Once the vehicles enter the assembly line, the sequence is fixed. The actual vehicle sequence may be controlled based on, for example, vehicle history data (e.g., past vehicle sequences of entering the assembly line, time stamps of the vehicle sequences, etc.) stored vehicle history entries database 126.

As shown in FIG. 1, the alert generation module 112 is in communication with the vehicle sequence controller 110, the vehicle group definitions database 122, and the performance profiles database 124. In various embodiments, the alert generation module 112 may generate and transmit an alert signal (e.g., to the supervisor control module 114) indicating at least one over-cycle risk (as identified by the performance profiles database 124) specific to at least one footprint according to the actual vehicle sequence determined by the vehicle sequence controller 110 for a conveyor in use. For example, the alert generation module 112 may receive the actual (fixed) vehicle sequence from the vehicle sequence controller 110. In such examples, the actual vehicle sequence may include a vehicle sequence of vehicle type A followed by another vehicle of the same or different type. With this information, the alert generation module 112 may identify, for the actual vehicle sequence, one or more over-cycle risks specific to one or more footprints of the conveyor. For example, the alert generation module 112 may identify that footprint B of the conveyor has a probability (e.g., 55.3%) of producing an over-cycle of one second, a probability (e.g., 31.6%) of producing an over-cycle of two seconds, and a probability (e.g., 13.1%) of producing an over-cycle of three seconds. The alert generation module 112 may then, in this example, generate and transmit an alert signal indicating the probabilities of over-cycles and their durations (e.g., collectively, over-cycle risks) specific to footprint B.

In the example of FIG. 1, the supervisor control module 114 is in communication with the alert generation module 112. For example, the supervisor control module 114 may receive the alert signal indicating the probabilities of over-cycles and their durations from the alert generation module 112. A supervisor may then be alerted to possible over-cycle risks in advance (e.g., before the vehicle type A reaches the footprint B) and take remedial actions (e.g., increase, change, etc. staffing at the footprint B, etc.) to avert the over-cycle risks. In such examples, the supervisor control module 114 may be one or more devices accessible to the supervisor, such as a handheld display device, a display device mounted in view of the supervisor, etc.

FIGS. 2-7 illustrate an example of identifying vehicle groups having different vehicle characteristics and their over-cycle distributions using, for example, the grouping module 106 and the performance profile module 108 of FIG. 1.

Figure 2:
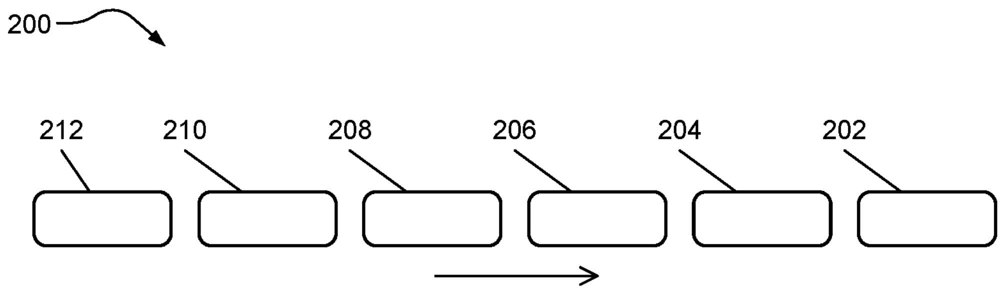
FIG. 2 is a functional block diagram of an example sequence of vehicles according to the present disclosure.
Figure 3:
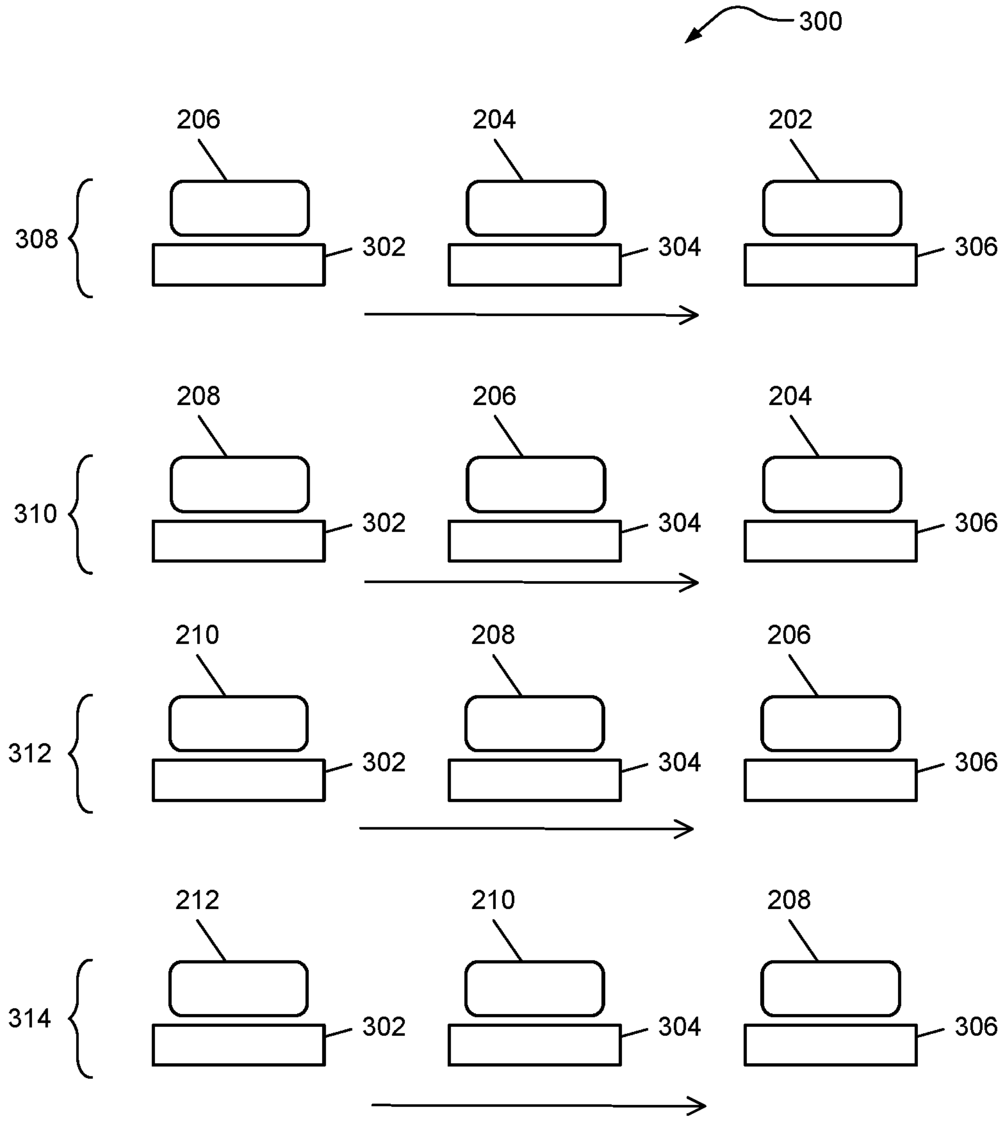
FIG. 3 is a functional block diagram of an example conveyor sequence with the vehicles of FIG. 2 advancing through footprints of a conveyor in cycles, according to the present disclosure.

FIG. 2 depicts an example sequence 200 of vehicles having different vehicle characteristics. As shown, the sequence 200 includes vehicles 202, 204, 206, 208, 210, 212 in an order. FIG. 3 depicts an example sequence 300 of one conveyor including three footprints 302, 304, 306, where the vehicles 202, 204, 206, 208, 210, 212 of FIG. 2 advance through the footprints 302, 304, 306 in four cycles 308, 310, 312, 314. For example, at cycle 308, the vehicle 202 is at footprint 306, the vehicle 204 is at footprint 304, and the vehicle 206 is at footprint 302. Additionally, at cycle 310, the vehicle 204 is at (e.g., advances to) footprint 306, the vehicle 206 is at footprint 304, and the vehicle 208 is at footprint 302; at cycle 312, the vehicle 206 is at footprint 306, the vehicle 208 is at footprint 304, and the vehicle 210 is at footprint 302; and at cycle 314, the vehicle 208 is at footprint 306, the vehicle 210 is at footprint 304, and the vehicle 212 is at footprint 302. In such examples, the vehicle 202 may be a black truck, the vehicle 204 may be a white truck, the vehicle 206 may be a black van, the vehicle 208 may be a red truck, the vehicle 210 may be a black truck (e.g., similar to the vehicle 202), and the vehicle 212 may be a white truck (e.g., similar to the vehicle 204). In the example of FIGS. 1-2, the sequences 200, 300 are shown in a simplified manner for clarity. With that said, it should be appreciated by those skilled in that art that more or less vehicles having difference vehicle characteristics, more or less footprints, and/or more or less cycles may be employed.

Then, historical cycle times for the conveyor may be collected (e.g., from the databases 118, 122 of FIG. 1) for each cycle 308, 310, 312, 314 for the particular vehicles 202, 204, 206, 208, 210, 212 at the footprints 302, 304, 306. For example, table 1 below shows historical cycle times for each footprint 302, 304, 306 for each cycle 308, 310, 312, 314 according to the sequences 200, 300.

TABLE 1

| | FP 302 | FP 304 | FP 306 | Overall | |
|---|---|---|---|---|---|
| Cycle 308 | 60 sec | 62 sec | 60 sec | 62 sec | Cycle |
| Cycle 310 | 60 sec | 64 sec | 61 sec | 64 sec | Time |
| Cycle 312 | 60 sec | 60 sec | 60 sec | 60 sec | |
| Cycle 314 | 60 sec | 61 sec | 61 sec | 61 sec | |

Figure 4:
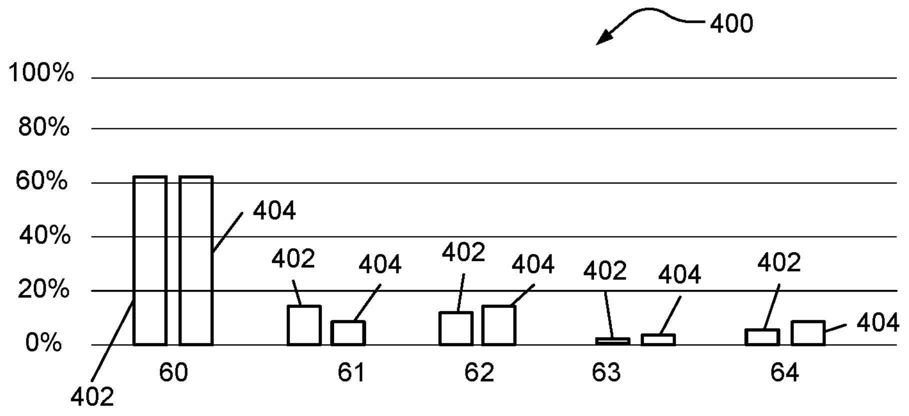
FIG. 4 is a graph of cycle time distributions for trucks and not trucks at one footprint of FIG. 3, according to the present disclosure.
Figure 5:
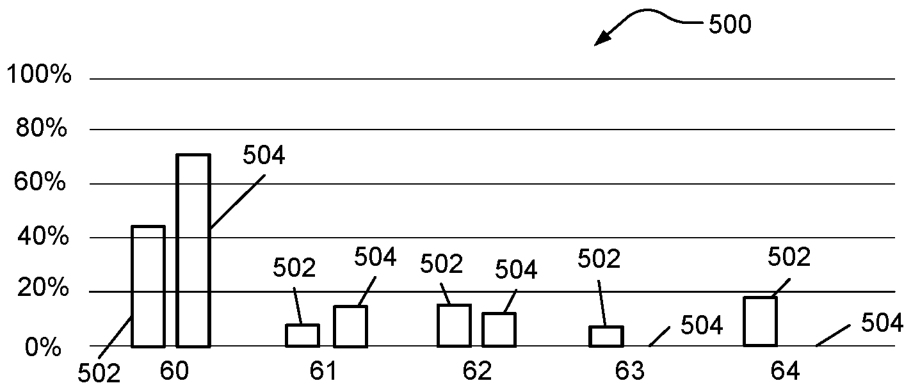
FIG. 5 is a graph of cycle time distributions for black vehicles and not black vehicles at one footprint of FIG. 3, according to the present disclosure.

Then, vehicle group definitions may be identified and over-cycle distributions for each group at each footprint may be calculated. For example, FIGS. 4-5 illustrate graphs 400, 500, depicting different identified vehicle group definitions with their cycle time distributions (Y-axis) at cycle times in seconds (X-axis) for the footprint 304 of FIG. 3. For example, the graph 400 of FIG. 4 depicts cycle time distributions at cycle times for the identified groups of trucks 402 vs not trucks (~trucks) 404 at the footprint 304, and the graph 500 of FIG. 5 depicts cycle time distributions at cycle times for the identified groups of black vehicles 502 vs not black vehicles (~black vehicles) 504 at footprint 304. Although FIGS. 4-5 depict particular groups with their cycle time distributions for footprint 304, it should be appreciated that all possible groups with different vehicle characteristics may be identified and their cycle time distributions may be calculated for each footprint of each conveyor of the assembly line.

In the example of FIGS. 4-5, the over-cycle distributions for each group may be calculated in any suitable manner. For example, the over-cycle distributions may be calculated using an adaptation of the Kaplan-Meier method (e.g., estimator) for lifecycle curves. For example, each footprint on a conveyor has an actual distribution for a given vehicle group, but detecting that distribution is difficult because there is a truncation to the sample distributions as the conveyor may stop due to another footprint's over-cycle on the same conveyor. By using the Kaplan-Meier method, it is possible to extract historical performance profiles of a target footprint (e.g., footprint 304, etc.) whose stops are due to over-cycle events of another footprint (e.g., footprint 306, etc.) that would otherwise pollute the samples for the target footprint. Thus, in this example, the actual distribution may be extracted for a footprint by treating the pollutions similar to the statistical truncation in the Kaplan Meier method.

In this manner, the cycle time distributions of each vehicle group with a vehicle characteristic (truck, black, etc.) and without the vehicle characteristic (not truck, not black, etc.) may be calculated. While FIGS. 4-5 depict example cycle time distributions for the identified groups of trucks 402, not trucks 404, black vehicles 502, and not black vehicles 504 at footprint 304 using the adaptation of the Kaplan-Meier method, it should be appreciated that the same determination may be done for all possible vehicle characteristics.

Then, the identifying of vehicle groups may cease if a threshold condition is satisfied. For example, a determination may be made (e.g., by the grouping module 106 and/or the performance profile module 108 of FIG. 1) as to whether the number of vehicles in a particular set of vehicle groups is below a threshold value, such as 100 vehicles, etc. Alternatively, a determination may be made as to whether a difference between the over-cycle distributions for a particular set of vehicle groups is below a threshold value, such as 5%, 10%, etc. In such examples, the particular set of vehicle groups may include any suitable set, such as trucks 402 or not trucks 404; vehicles with colors red, white, and black; trucks 402 or not trucks 404 and also vehicles with colors red, white, and black, etc. If either threshold condition is satisfied, the identifying of vehicle groups may cease. As such, in the example of FIGS. 4-5, the identified groups may remain at trucks 402, not trucks 404, black vehicles 502, and not black vehicles 504 for footprint 304.

Otherwise, the identifying of vehicle groups may continue. In such scenarios, the vehicle characteristic having the largest over-cycle distribution difference may be selected. For example, and with reference to the example of FIGS. 4-5, the vehicle characteristic of black vs not black is selected because the cycle time distribution difference between black vehicles 502 and not black vehicles 504 is the largest (e.g., about 28% at 60 seconds) among other cycle time distributions (e.g., the cycle time distribution shown in FIG. 4). Then, for each previously identified vehicle group having the selected vehicle characteristic (e.g., black vehicles, not black vehicles, etc.), over-cycle distributions are calculated for identified subsets of the vehicle group for all other vehicle characteristics. Such over-cycle distributions may be calculated in a similar manner as explained above (e.g., using the adaptation of the Kaplan-Meier method).

Figure 6:
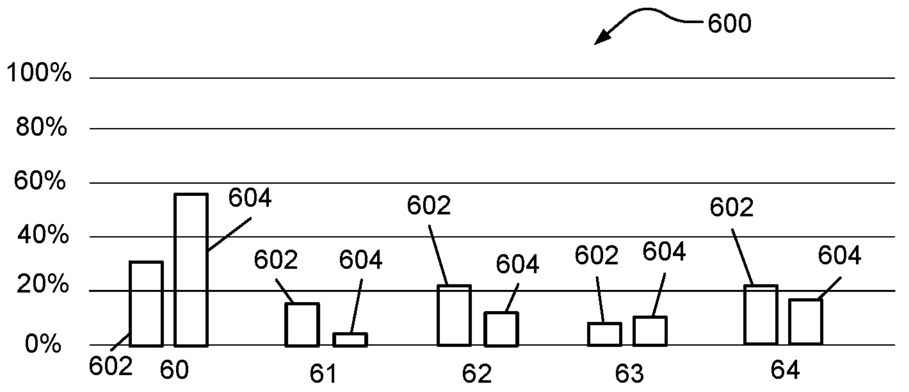
FIG. 6 is a graph of cycle time distributions for black trucks and black not trucks at one footprint of FIG. 3, according to the present disclosure.

For example, FIG. 6 illustrates a graph 600 depicting different identified group definitions with their cycle time distributions (Y-axis) at cycle times in seconds (X-axis) for the footprint 304 of FIG. 3. More specifically, the graph 600 of FIG. 6 depicts distributions at cycle times for the identified groups of black trucks 602 vs black not trucks (black ~trucks) 604 at the footprint 304. While FIG. 6 depicts example cycle time distributions for the identified groups of black trucks 602 and black not trucks 604 at footprint 304 (e.g., using the adaptation of the Kaplan-Meier method), it should be appreciated that the same determination may be done for all possible vehicle characteristics, at each footprint of each conveyor of the assembly line.

After the additional vehicle groups are identified (e.g., black trucks 602 and black not trucks 604), the identifying of additional vehicle groups may cease if a threshold condition is satisfied, as explained above. For example, if the number of vehicles in a particular set of vehicle groups is below a threshold value (e.g., 100 vehicles, etc.) or the difference between the over-cycle distributions for a particular set of groups is below a threshold value (e.g., 5%, 10%, etc.), the identifying of additional vehicle groups may cease. If not, the identifying of vehicle groups may continue by again selecting the vehicle characteristics having the largest over-cycle distribution difference and calculating cycle time distributions for identified subsets of the vehicle group for all other vehicle characteristics, as explained above. Such actions may be performed on each subset (e.g., each split) of the group.

Figure 7:
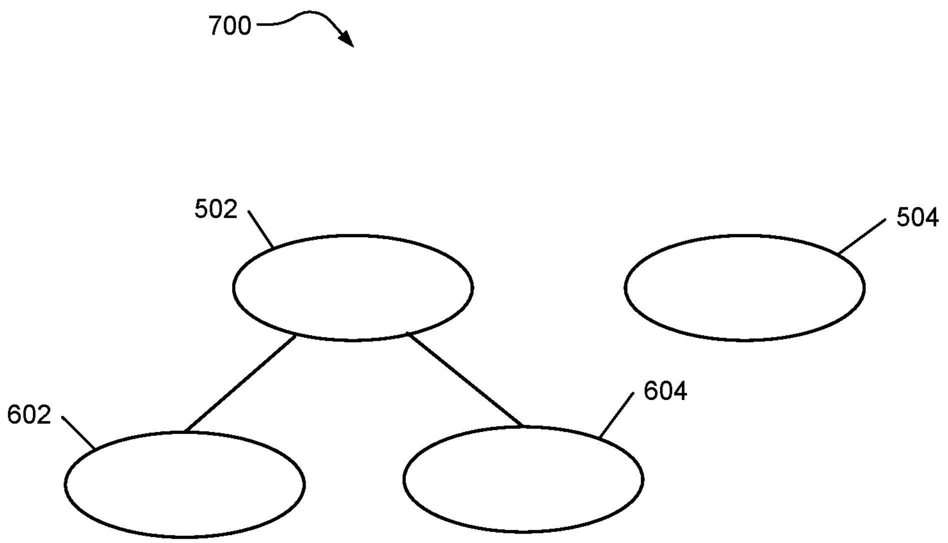
FIG. 7 is a functional block diagram example identified vehicle groups of FIGS. 4-6, according to the present disclosure.

With continued reference to the example above, FIG. 7 depicts an example diagram 700 of the identified groups from FIGS. 4-6. For example, in the example above, splitting the black vehicle group 502 into the black trucks group 602 (e.g., group 1.1) and the black not trucks (e.g., black vans, etc.) group 604 (e.g., group 1.2) may produce satisfactorily different distributions. Additionally, it is assumed in the example above that the not black vehicle group 504

(e.g., group 2) has no additional vehicle characteristic that produce satisfactorily different distributions.

Table 2 below shows the groups identified in FIG. 7 and corresponding cycle time distributions for cycle times of 60 seconds, 61 seconds, 62 seconds, 63 seconds, and 64 seconds at the footprint 304. The cycle time distributions are extracted from the graphs 500, 600.

TABLE 2

| Group Name | 60 sec | 61 sec | 62 sec | 63 sec | 64 sec | Cycle Time |
|---|---|---|---|---|---|---|
| 1.1: Black Trucks (602) | 31% | 15% | 23% | 8% | 23% | Cycle Time Distributions |
| 1.2: Black Not Trucks (604) | 57% | 4% | 13% | 9% | 17% | |
| 2: Not Black Vehicles (504) | 73% | 14% | 13% | 0% | 0% | |

Additionally, in some embodiments, the identifying of vehicle groups (e.g., by the grouping module 106) may consider the combinations of vehicle characteristics in pairs of vehicles in the sequence. For example, it may be known that the sequence of two vehicles of the same or different groups passing through a particular footprint (e.g., the footprint 304, etc.) is problematic. As such, the sequence of repeating vehicles (e.g., vans) with the same vehicle characteristic (e.g., six-speed transmission option), the sequence of one vehicle with a particular vehicle characteristic followed by another vehicle with another particular vehicle characteristic, etc. can be an issue. In such examples, over-cycle distributions for pairs of vehicles in the sequence may be calculated (e.g., by the performance profile module 108 of FIG. 1) using the Kaplan-Meier method, and then possible subsequent alerts may take into account the combinations of vehicle characteristics in pairs of vehicles in the sequence.

Figure 8:
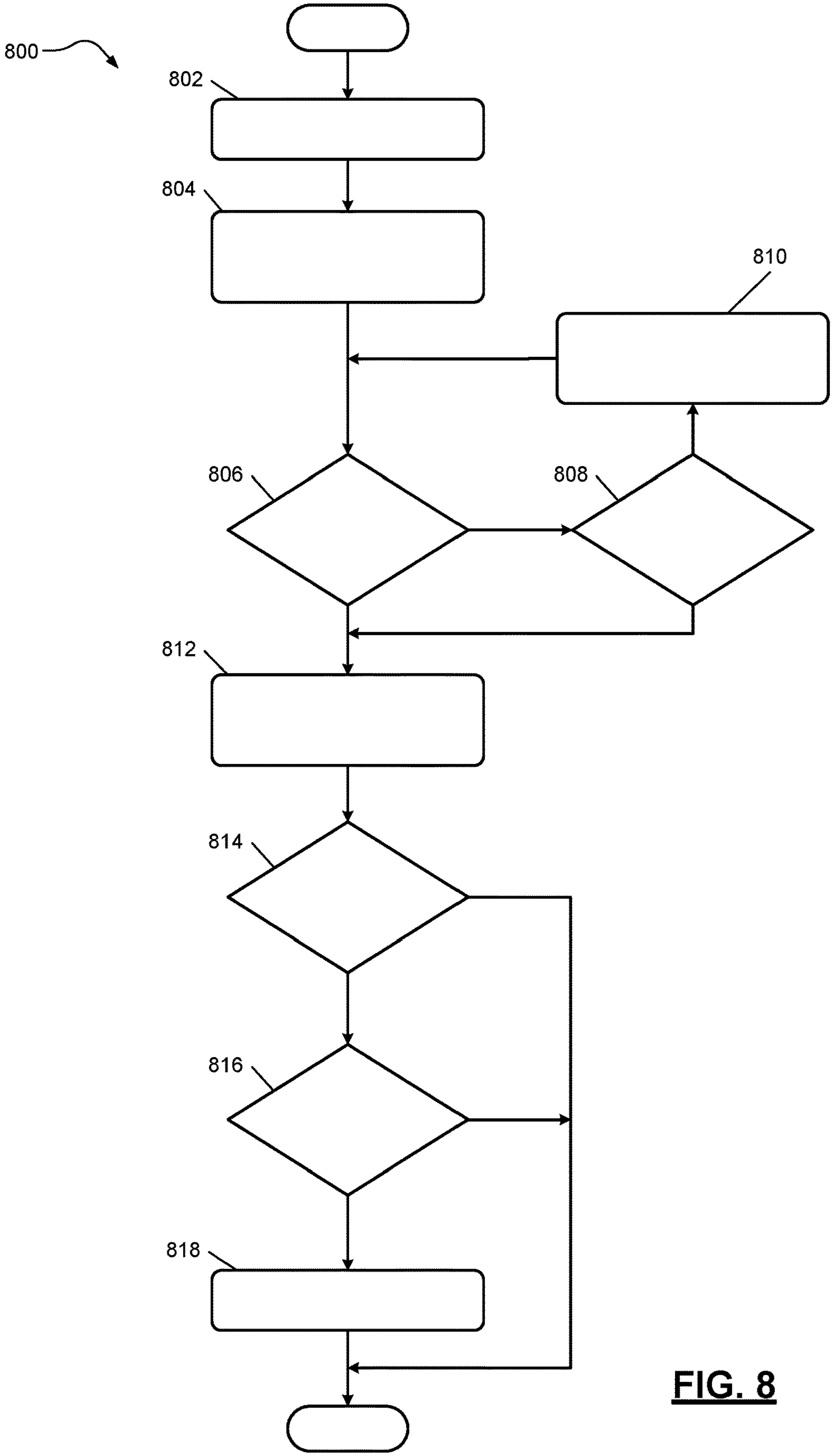
FIG. 8 is a flowchart of a control process for identifying over-cycle risks associated with an assembly line, according to the present disclosure.

FIG. 8 illustrates an example control process 800 for identifying over-cycle risks employable by the system 100 of FIG. 1. Although the control process 800 is described in relation to the system 100 of FIG. 1, the control process 800 may be employable by any suitable system.

As shown in FIG. 8, control begins at 802 where data representing conveyor contents per cycle definitions, over-cycle events, and possible vehicle characteristics is received by, for example, the grouping module 106 and/or the performance profile module 108 of FIG. 1. In such examples, the data may be received from, for example, one or more of the databases 116, 118, 120 of FIG. 1 and/or other suitable databases. Control then proceeds to 804 where the grouping module 106 and the performance profile module 108 initiate a process of identifying vehicles groups and calculating over-cycle distributions, as explained herein. Control then proceeds to 806.

At 806, control determines whether a threshold condition associated with the identified vehicles groups or calculated over-cycle distributions is satisfied. For example, the grouping module 106 may determine whether the number of vehicles in an identified vehicle group is below a threshold value or the performance profile module 108 may determine whether a difference between the over-cycle distributions for a particular set of groups is below a threshold value, as explained above. If no at 806, control proceeds to 808 where control determines whether all possible characteristics (e.g., options) are exhausted. If no at 808, control proceeds to 810 where the process of identifying vehicles groups and calculating over-cycle distributions is continued, and then returns to 806. If yes at 806 or 808, control proceeds to 812 where the process of identifying vehicles groups and calculating over-cycle distributions is ceased (e.g., stopped, discontinued, etc.).

Control then proceeds to 814. At 814, control determines whether an actual (e.g., in progress, etc.) vehicle sequence is received. If no, control ends as shown in FIG. 8. If yes at 814, control proceeds to 816.

At 816, control determines whether any over-cycle risk is identified for the received actual vehicle sequence. For example, the alert generation module 112 may identify, for the actual vehicle sequence, one or more over-cycle risks specific to one or more footprints of the conveyor. If no at 816, control ends as shown in FIG. 8. If yes at 816, control proceeds to 818.

At 818, control generates and transmits an alert signal. For example, the alert generation module 112 may generate and transmit the alert signal indicating probabilities of over-cycles and their durations (e.g., collectively, over-cycle risks) specific to a particular footprint. In various embodiments, the alert signal may be transmitted to, for example, the supervisor control module 114 of FIG. 1. Control may then end.

Figure 9:
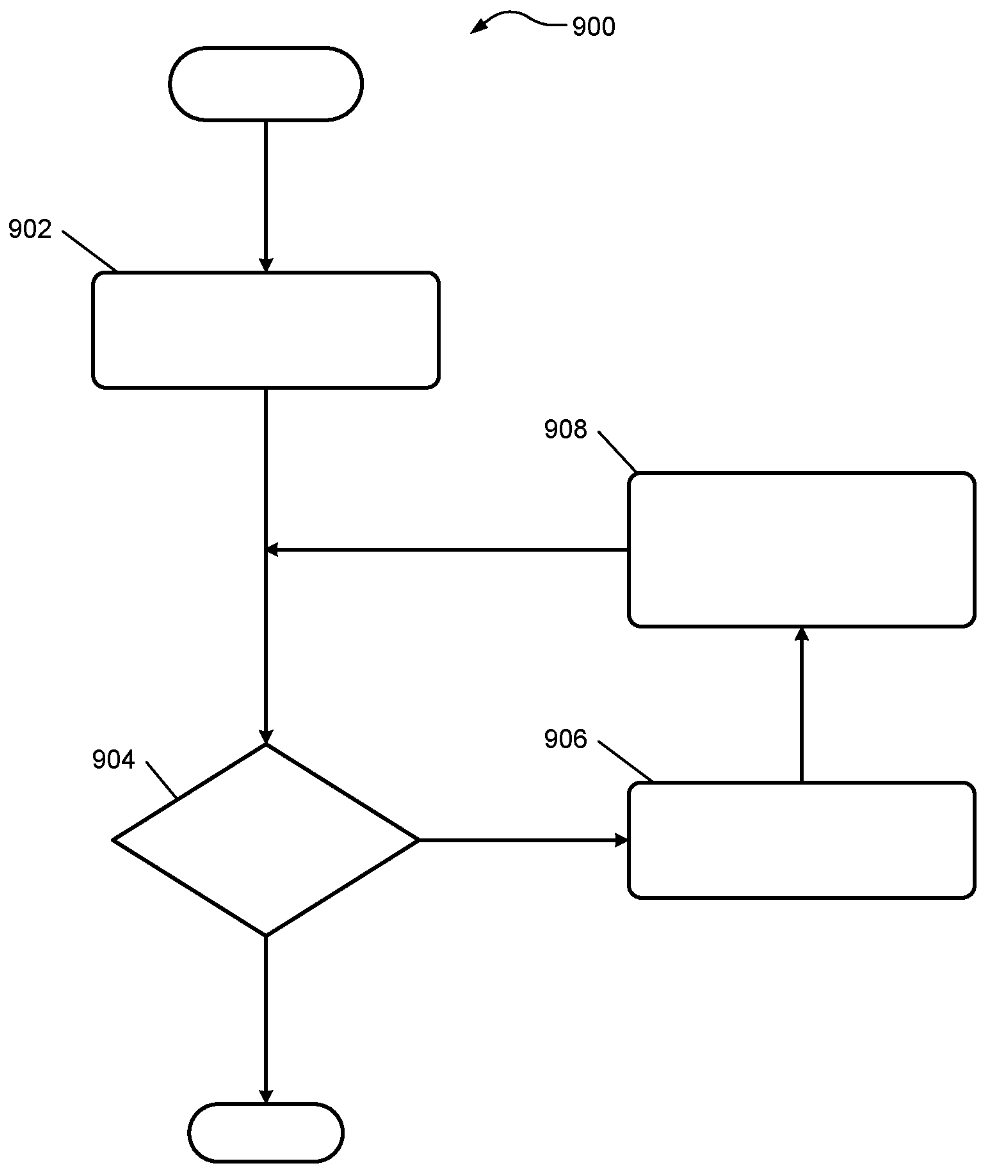
FIG. 9 is a flowchart of a control process for identifying vehicles groups and calculating cycle time distributions, according to the present disclosure.

FIG. 9 illustrates an example control process 900 for identifying groups of vehicles and calculating over-cycle distributions employable by the system 100 of FIG. 1. Although the control process 900 is described in relation to the system 100 of FIG. 1, the control process 900 may be employable by any suitable system.

As shown in FIG. 9, control begins at 902 where control calculates, for each vehicle characteristic, over-cycle distributions for an identified vehicle group having that vehicle characteristic and not having that vehicle characteristic. The vehicle groups may be identified by the grouping module 106. The over-cycle distributions may be calculated with the performance profile module 108 as explained above (e.g., relying on the adaptation of the Kaplan-Meier method), and for each footprint of each conveyor in an assembly line. Control then proceeds to 904.

At 904, control determines a threshold condition associated with the identified vehicles groups or calculated over-cycle distributions is satisfied, as explained above. If no, control proceeds to 906. Otherwise, control ends.

At 906, control selects the vehicle characteristic having the largest over-cycle distribution difference. For example, and as explained above, control may select the vehicle characteristic of black vehicles vs not black vehicles (or another vehicle characteristic) having the largest over-cycle distribution difference among the other over-cycle distributions. Then, subsets of the vehicle group having the selected vehicle characteristic are identified. Control then proceeds to 908.

At 908, control calculates, for subset of vehicle groups having the selected vehicle characteristics, over-cycle distributions for all other vehicle characteristics. For example, and as explained above, if the vehicle characteristic of black vs not black is selected (e.g., by the grouping module 106), control calculates over-cycle distributions for black vehicles having another vehicle characteristic (e.g., black truck) and black vehicles not having the other vehicle characteristic (e.g., black non-truck). The over-cycle distributions may be calculated with the performance profile module 108 as explained above (e.g., relying on the adaptation of the Kaplan-Meier method), for all other vehicle characteristics, and for each footprint of each conveyor in an assembly line. Control then returns to 904.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for identifying over-cycle risks associated with an assembly line including at least one conveyor configured to move vehicles through a plurality of footprints in unison, each footprint representing a location where vehicle content is assembled, the method comprising:

receiving historical data;

for each footprint of the conveyor, identifying vehicle groups having different vehicle characteristics and over-cycle distributions for each vehicle group by:

calculating, based on the received historical data, for each vehicle characteristic of the different vehicle characteristics, an over-cycle distribution for a first vehicle group having the vehicle characteristic and an over-cycle distribution for a second vehicle group not having the vehicle characteristic, wherein calculating, for each vehicle characteristic, the over-cycle distribution for the first vehicle group and the over-cycle distribution for the second vehicle group includes calculating the over-cycle distribution for the first vehicle group and the over-cycle distribution for the second vehicle group with the Kaplan-Meier method;

determining whether either the number of vehicles in the first or second vehicle group or a difference between the over-cycle distributions for the first and second vehicle groups satisfies a threshold condition; and in response to satisfying the threshold condition, cease identifying the vehicle groups;

receiving an actual vehicle sequence for the assembly line; and identifying, for the actual vehicle sequence for the assembly line, over-cycle risks based on the identified vehicle groups and the over-cycle distributions for each vehicle group, wherein each over-cycle risk corresponds to a probability of greater than zero of having an over-cycle event at a footprint of the assembly line in which a cycle time is greater than a target cycle time.

2. The method of claim 1, further comprising:

in response to not satisfying the threshold condition:

selecting the vehicle characteristic having the largest over-cycle distribution difference; and calculating, for a vehicle group having the selected vehicle characteristic, an over-cycle distribution for a first subset of the vehicle group having another vehicle characteristic of the different vehicle characteristics and an over-cycle distribution for a second subset of the vehicle group not having the other vehicle characteristic.

3. The method of claim 2, wherein calculating the over-cycle distributions for the first and second subsets of the vehicle group includes calculating the over-cycle distributions with the Kaplan-Meier method.

4. The method of claim 2, further comprising:

determining whether either the number of vehicles in the first or second subset of the vehicle group or a difference between the over-cycle distributions for the first and second subsets of the vehicle group satisfies the threshold condition; and wherein cease identifying the vehicle groups includes cease identifying the vehicle groups in response to either the number of vehicles in the first or second subset of the vehicle group or the difference between the over-cycle distributions for the first and second subsets of the vehicle group satisfying the threshold condition.

5. The method of claim 1, further comprising:

generating and transmitting an alert signal indicating the over-cycle risks.

6. The method of claim 5, wherein transmitting the alert signal includes transmitting the alert signal to a supervisor control module.

7. A system for identifying over-cycle risks associated with an assembly line including at least one conveyor configured to move vehicles through a plurality of footprints in unison, each footprint representing a location where vehicle content is assembled, the system comprising a computing module configured to:

receive historical data;

for each footprint of the conveyor:

identify vehicle groups having different vehicle characteristics and over-cycle distributions for each vehicle group by;

calculating, based on the received historical data, for each vehicle characteristic of the different vehicle characteristics, an over-cycle distribution for a first vehicle group having the vehicle characteristic and an over-cycle distribution for a second vehicle group not having the vehicle characteristic, wherein calculating, for each vehicle characteristic, the over-cycle distribution for the first vehicle group and the over-cycle distribution for the second vehicle group includes calculating the over-cycle distribution for the first vehicle group and the over-cycle distribution for the second vehicle group with the Kaplan-Meier method;

determining whether either the number of vehicles in the first or second vehicle group or a difference between the over-cycle distributions for the first and second vehicle groups satisfies a threshold condition; and in response to satisfying the threshold condition, cease identifying the vehicle groups;

receive an actual vehicle sequence for the assembly line; and identify, for the actual vehicle sequence for the assembly line, over-cycle risks based on the identified vehicle groups and the over-cycle distributions for each vehicle group, wherein each over-cycle risk corresponds to a probability of greater than zero of having an over-cycle event at a footprint of the assembly line in which a cycle time is greater than a target cycle time.

8. The system of claim 7, wherein the computing module is configured, in response to not satisfying the threshold condition, to:

select the vehicle characteristic having the largest over-cycle distribution difference; and calculate, for a vehicle group having the selected vehicle characteristic, an over-cycle distribution for a first subset of the vehicle group having another vehicle characteristic of the different vehicle characteristics and an over-cycle distribution for a second subset of the vehicle group not having the other vehicle characteristic.

9. The system of claim 8, wherein the computing module is configured to calculate the over-cycle distributions for the first and second subsets of the vehicle group with the Kaplan-Meier method.

10. The system of claim 8, wherein the computing module is configured to:

determine whether either the number of vehicles in the first or second subset of the vehicle group or a difference between the over-cycle distributions for the first and second subsets of the vehicle group satisfies the threshold condition; and in response to either the number of vehicles in the first or second subset of the vehicle group or the difference between the over-cycle distributions for the first and second subsets of the vehicle group satisfying the threshold condition, cease identifying the vehicle groups.

11. The system of claim 7, wherein the computing module is configured to:

generate and transmit an alert signal indicating the over-cycle risks.

12. The system of claim 11, wherein the computing module is configured to transmit the alert signal to a supervisor control module.

13. A system for identifying over-cycle risks associated with an assembly line including at least one conveyor configured to move vehicles through a plurality of footprints in unison, each footprint representing a location where vehicle content is assembled, the system comprising a computing module configured to:

receive historical data;

for each footprint of the conveyor:

identify vehicle groups having different vehicle characteristics and over-cycle distributions for each vehicle group by;

calculating, based on the received historical data, for each vehicle characteristic of the different vehicle characteristics, an over-cycle distribution for a first vehicle group having the vehicle characteristic and an over-cycle distribution for a second vehicle group not having the vehicle characteristic;

determining whether either the number of vehicles in the first or second vehicle group or a difference between the over-cycle distributions for the first and second vehicle groups satisfies a threshold condition;

in response to not satisfying the threshold condition, selecting the vehicle characteristic having the largest over-cycle distribution difference, calculating, for a vehicle group having the selected vehicle characteristic, an over-cycle distribution for a first subset of the vehicle group having another vehicle characteristic of the different vehicle characteristics and an over-cycle distribution for a second subset of the vehicle group not having the other vehicle characteristic, calculating the over-cycle distributions for the first and second subsets of the vehicle group, and determining whether either the number of vehicles in the first or second subset of the vehicle group or a difference between the over-cycle distributions for the first and second subsets of the vehicle group satisfies the threshold condition; and in response to either the number of vehicles in the first or second subset of the vehicle group or the difference between the over-cycle distributions for the first and second subsets of the vehicle group satisfying the threshold condition, cease identifying the vehicle groups;

receive an actual vehicle sequence for the assembly line; and identify, for the actual vehicle sequence for the assembly line, over-cycle risks based on the identified vehicle groups and the over-cycle distributions for each vehicle group, wherein each over-cycle risk corresponds to a probability of greater than zero of having an over-cycle event at a footprint of the assembly line in which a cycle time is greater than a target cycle time.

14. The system of claim 13, wherein the computing module is configured to calculate the over-cycle distributions for the first and second vehicle groups with the Kaplan-Meier method.

15. The system of claim 14, wherein the computing module is configured to generate and transmit an alert signal indicating the over-cycle risks.

16. The system of claim 15, wherein the computing module is configured to transmit the alert signal to a supervisor control module.

17. The system of claim 15, wherein the computing module is configured to calculate the over-cycle distributions for the first and second subsets of the vehicle group with the Kaplan-Meier method.

18. The system of claim 13, wherein the computing module is configured to generate and transmit an alert signal indicating the over-cycle risks.

19. The system of claim 18, wherein the computing module is configured to transmit the alert signal to a supervisor control module.

20. The system of claim 18, wherein the computing module is configured to calculate the over-cycle distributions for the first and second subsets of the vehicle group with the Kaplan-Meier method.

* * * * *